(12) United States Patent
Vepsalainen

(10) Patent No.: US 8,516,602 B2
(45) Date of Patent: Aug. 20, 2013

(54) METHODS, APPARATUSES, AND COMPUTER PROGRAM PRODUCTS FOR PROVIDING DISTRIBUTED ACCESS RIGHTS MANAGEMENT USING ACCESS RIGHTS FILTERS

(75) Inventor: Ari Vepsalainen, Espoo (FI)

(73) Assignee: Nokia Corporation, Espoo (FI)

( * ) Notice: Subject to any disclaimer, the term of this patent is extended or adjusted under 35 U.S.C. 154(b) by 1067 days.

(21) Appl. No.: 12/109,724

(22) Filed: Apr. 25, 2008

(65) Prior Publication Data
US 2009/0271870 A1    Oct. 29, 2009

(51) Int. Cl.
*G06F 21/00* (2006.01)
(52) U.S. Cl.
USPC .............. 726/27; 713/150; 713/154; 713/170
(58) Field of Classification Search
None
See application file for complete search history.

(56) References Cited

U.S. PATENT DOCUMENTS

| | | | |
|---|---|---|---|
| 6,253,251 B1 | 6/2001 | Benantar et al. | |
| 7,293,052 B1 * | 11/2007 | Kavasseri | 709/229 |
| 7,484,103 B2 * | 1/2009 | Woo et al. | 713/189 |
| 7,873,988 B1 * | 1/2011 | Issa et al. | 726/4 |
| 2006/0071067 A1 | 4/2006 | Iida | |
| 2007/0038869 A1 | 2/2007 | Tomlinson | |
| 2007/0226488 A1 * | 9/2007 | Lin et al. | 713/156 |
| 2008/0189794 A1 * | 8/2008 | Staring et al. | 726/27 |

FOREIGN PATENT DOCUMENTS

| | | |
|---|---|---|
| EP | 0 456 920 A2 | 11/1991 |
| EP | 0 940 960 A1 | 9/1999 |
| JP | 2005032241 | 2/2005 |
| WO | WO 96/42041 | 12/1996 |
| WO | WO 2006/040806 A1 | 4/2006 |

* cited by examiner

*Primary Examiner* — Brandon Hoffman
*Assistant Examiner* — Samuel Ambaye
(74) *Attorney, Agent, or Firm* — Alston & Bird LLP

(57) ABSTRACT

An apparatus may include a processor configured to generate an access rights filter based upon a set of access rights settings. The processor may be further configured to generate an authorization key accepted by the generated access rights filter. The processor may be additionally configured to distribute one or more of the access rights filter and authorization key to an access rights management entity.

21 Claims, 11 Drawing Sheets

METHODS, APPARATUSES, AND COMPUTER PROGRAM PRODUCTS FOR PROVIDING DISTRIBUTED ACCESS RIGHTS MANAGEMENT USING ACCESS RIGHTS FILTERS

TECHNOLOGICAL FIELD

Embodiments of the present invention relate generally to mobile communication technology and, more particularly, relate to methods, apparatuses, and computer program products for providing distributed access rights management using access rights filters.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to further improve the ease of information transfer and convenience to users involves the filtering of content and services based on a user's access rights. The growth in wireless and mobile networking technologies as well as continued development of processing power and miniaturization of high-powered processors and components used in mobile computing devices has allowed for the access of content and services by even handheld computing devices. Examples of such content and services accessible by users of computing devices include e-mail, instant messaging, multi-player gaming, peer-to-peer file transfer, web browsing, social networking, photograph hosting, as well as online databases and other network-accessible data.

It is common practice to limit access to content and services based upon access permissions of users seeking to access services. In this regard, some users may be denied access to a service, while some may have limited access to the service, and others may enjoy unfettered access to the service. However, current methods of managing access permissions may require a user to manage access permissions for services using a central access management provider. In this regard, access permissions must be set for each user of a protected service, such as by identifying users and grouping them in access permissions lists where each access permission list conveys a certain level of access rights. Each time a new user is added to the service, access permissions must be configured individually for the new user. Thus when a user seeks to access a service, the user must authenticate to or otherwise be identified by the central access management provider so that the central access management provider may determine the user's defined access permissions and grant access to the service accordingly.

Current methods and systems for managing access rights do not sufficiently allow for a distributed approach where access permissions may be managed independent of user identity. Accordingly, it may be advantageous to provide users with a system for distributed access rights management using access rights filters. Such a system may thereby address at least some of the disadvantages described above.

BRIEF SUMMARY

A method, apparatus, and computer program product are therefore provided to enable providing distributed access rights management using access rights filters. In particular, a method, apparatus, and computer program product are provided to enable, for example, the generation of an access rights filter and a corresponding authorization key that may be distributed so as to provide access rights management independent of user or device identity.

In one exemplary embodiment, a method is provided which may include generating an access rights filter based upon a set of access rights settings. The method may further include generating an authorization key accepted by the generated access rights filter. The method may additionally include distributing one or more of the access rights filter and authorization key to an access rights management entity. In some embodiments, the access rights filter may comprise executable code generated based upon capabilities of an access rights management entity to which the access rights filter is to be distributed.

In another exemplary embodiment, a computer program product is provided. The computer program product includes at least one computer-readable storage medium having computer-readable program code portions stored therein. The computer-readable program code portions include first, second, and third program code portions. The first program code portion is for generating an access rights filter based upon a set of access rights settings. The second executable portion is for generating an authorization key accepted by the generated access rights filter. The third executable portion is for distributing one or more of the access rights filter and authorization key to an access rights management entity.

In another exemplary embodiment, an apparatus is provided, which may include a processor. The processor may be configured to generate an access rights filter based upon a set of access rights settings. The processor may be further configured to generate an authorization key accepted by the generated access rights filter. The processor may be additionally configured to distribute one or more of the access rights filter and authorization key to an access rights management entity.

In another exemplary embodiment, an apparatus is provided. The apparatus may include means for generating an access rights filter. The apparatus may additionally include means for generating an authorization key accepted by the generated access rights filter. The apparatus may further include means for distributing one or more of the access rights filter and authorization key to an access rights management entity.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
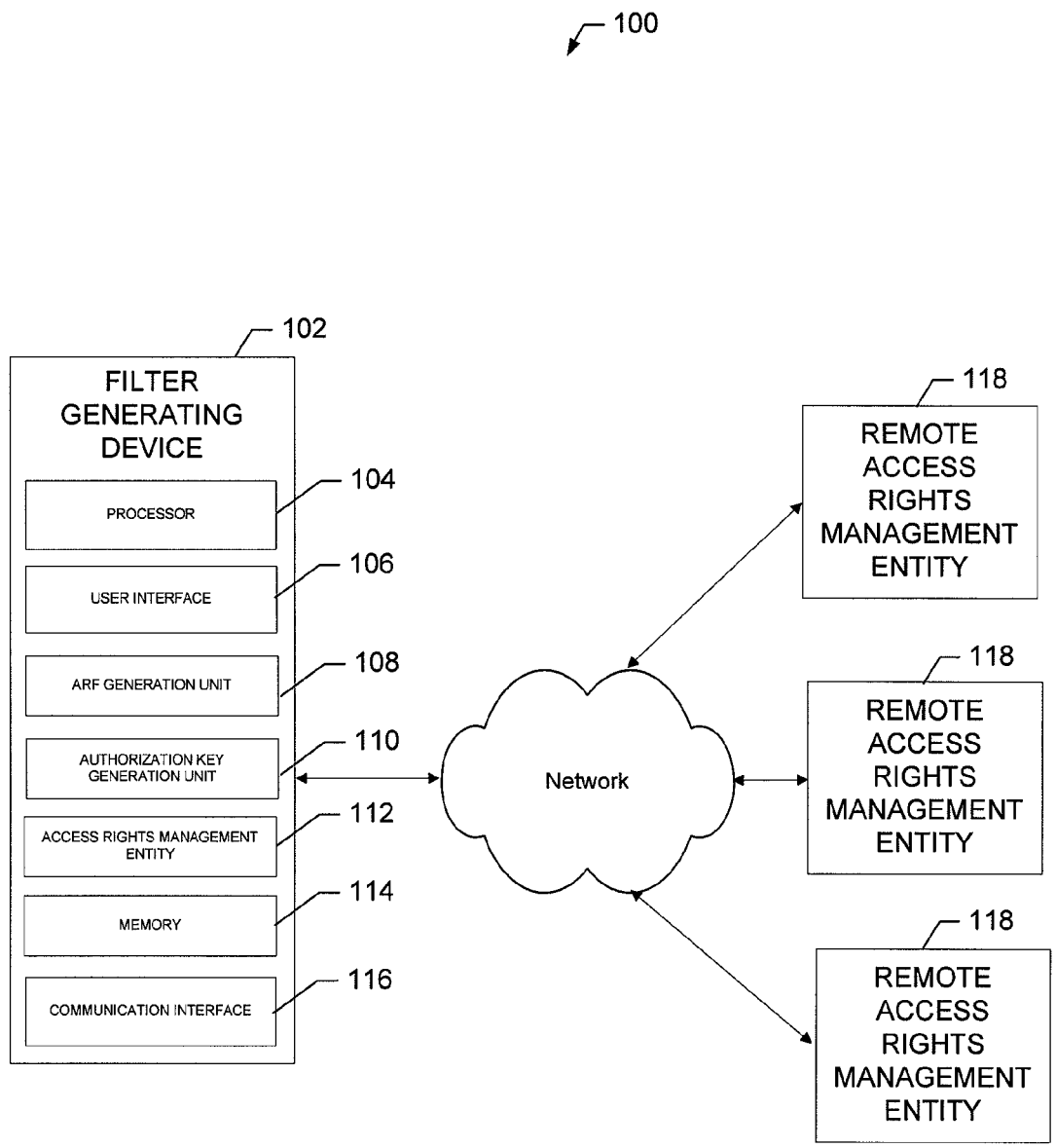
FIG. 1 illustrates a block diagram of a system for providing distributed access rights management according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a system 100 for providing distributed access rights management using access rights filters according to an exemplary embodiment of the invention. As used herein, "exemplary" merely means an example and as such represents one example embodiment for the invention and should not be construed to narrow the scope or spirit of the invention in anyway. It will be appreciated that the scope of the invention encompasses many potential embodiments in addition to those illustrated and described herein. Accordingly, while FIG. 1 illustrates one example of a configuration of a system for providing distributed access rights management, numerous other configurations may also be used to implement embodiments of the present invention.

Referring now to FIG. 1, the system 100 may include a filter generating device 102 and a plurality of remote access rights management entities 118 in communication over a network. The filter generating device 102 and remote access rights management entities 118 may each be embodied as any computing device or combination of a plurality of computing devices. In this regard, the filter generating device 102 and remote access rights management entities 118 may each be embodied, for example, as a single computing device, such as a personal computer, laptop computer, personal digital assistant, cellular telephone, or other mobile computing device. Additionally or alternatively, the filter generating device 102 and remote access rights management entities 118 may each be embodied, for example, as a server or a server cluster. The network over which the filter generating device 102 and remote access rights management entities 118 communicate may be any wireless or wireline network or combination thereof. For example, the network may comprise a LAN, WLAN, WAN, cellular network, or combination thereof. Additionally, although the system 100 only illustrates one filter generating device 102 for purposes of example, the system 100 may include a plurality of filter generating devices.

The filter generating device 102 may comprise a processor 104, user interface 106, access rights filter (ARF) generation unit 108, authorization key generation unit 110, access rights management entity 112, memory 114, and communication interface 116. The processor 104 may be embodied in a number of different ways. For example, the processor 104 may be embodied as a microprocessor, a coprocessor, a controller, or various other processing means or elements including integrated circuits such as, for example, an ASIC (application specific integrated circuit) or FPGA (field programmable gate array). In an exemplary embodiment, the processor 104 may be configured to execute instructions stored in the memory 114 or otherwise accessible to the processor 304.

The user interface 106 may be in communication with the processor 104 to receive an indication of a user input at the user interface 106 and/or to provide an audible, visual, mechanical, or other output to the user. As such, the user interface 106 may include, for example, a keyboard, a mouse, a joystick, a touch screen display, a conventional display, a microphone, a speaker, or other input/output mechanisms. In embodiments where the filter generating device 102 is embodied as a server, the user interface 215 may be limited. In exemplary embodiments, the user interface 106 may provide means for a user to enter access rights settings and other information that may be used to define and generate access rights filters. Thus in addition to the mechanical input/output mechanisms already described, the user interface 106 may additionally comprise a graphical user interface or other software means to facilitate user interaction so that a user may enter information defining access rights parameters used to generate access rights filters.

The ARF generation unit 108 may be any means for generating an access rights filter embodied as hardware, software, firmware, or some combination thereof and may be embodied as or otherwise controlled by the processor 104. In embodiments where the ARF generation unit 108 is embodied separately from the processor 104, the ARF generation unit 108 may be in communication with the processor 104. The ARF generation unit 108 may be configured to receive a set of access rights settings. The set of access rights settings may be received, for example, from a user via the user interface 106. The user may be local to the filter generating device 102 in embodiments where the filter generating device 102 is a personal or mobile computing device. Alternatively, the user may be remotely communicating with the filter generating device 102 from another computing device, such as a remote access rights management entity 118. Additionally or alternatively, the ARF generation unit 108 may be configured to receive a set of access rights settings by retrieving pre-stored access rights settings, such as from memory 114.

The ARF generation unit 108 may be further configured to determine capabilities of an access rights management entity to which an access rights filter is to be distributed. As used herein, the general term "access rights management entity" refers to any computing device, hardware, software, firmware, or some combination thereof which may execute an access rights filter. Thus an access rights management entity may be embodied locally to a computing device that generates access rights filters, such as the access rights management entity 112 of the filter generating device 102, or may be embodied in or as a remote computing device, such as a remote access rights management entity 118. The capabilities which the ARF generation unit 108 is configured to determine may include, for example, (1) a type of processor(s) embodied in the access rights management entity or on which the access rights management entity is embodied or executed by and (2) a type of operating system embodied on the access rights management entity or on which the access rights management entity is operated. The ARF generation unit 108 may be configured to determine capabilities of an access rights management entity by communicating with the access rights management entity. Additionally or alternatively, the ARF generation unit 108 may be configured to determine capabilities of an access rights management entity from information received with a set of access rights settings by the user interface 106.

The ARF generation unit 108 may be further configured to generate an access rights filter based upon a set of access rights settings. In applicable situations, the ARF generation unit 108 may be configured to additionally generate an access rights filter based upon the determined capabilities of an access rights management entity to which the generated access rights filter is to be distributed. In an exemplary embodiment, the ARF generation unit 108 may be configured to generate an access rights filter comprised of executable code so that it may be freely distributed to and executed by access rights management entities without requiring the access rights management entity to have any knowledge of the access rights settings included in the ARF or requiring the access rights management entity to include any proprietary access management software or interface. Accordingly, the determined capabilities of an access rights management entity may be used to generate the ARF executable so that the access rights management entity may execute the generated ARF.

An ARF generated by the ARF generation unit 108 may be configured to receive a service access request message from a computing device remote to the one on which the ARF is executed. A "service access request message" may be any message, request, command, or other indication from any remote device seeking access to a service or other resource that is protected by the ARF. As used herein, "service" may include data or other content as well as services, such as, for example, e-mail, instant messaging, multi-player gaming, peer-to-peer file transfer, web browsing, social networking, photograph hosting, video hosting, and other multimedia hosting services that may be accessed by and/or supplied to remote computing devices over a network. The ARF may be configured to determine based upon the service access request message the access rights of a user or device making a service access request. In an exemplary embodiment, the service access request message may comprise one or more authorization keys, which may be included in either the message header or as parameters in the message body. In this regard, an ARF may be configured to grant access to a service to users having one or more authorization keys accepted by the ARF. The ARF generation unit 108 may be configured to generate ARFs that accept multiple authorization keys wherein each accepted authorization key conveys a different level of authorization rights to a user possessing the authorization key. Additionally or alternatively, the level of authorization rights to which a user is entitled may be determined by a particular combination of authorization keys included in the service access request message.

Accordingly, the ARF may be configured to function as an "input filter" and filter incoming service access request messages based upon determined access rights of a requesting user. In this regard, the ARF may, for example, simply ignore service access request messages from users who do not have access rights to the requested service, such as indicated by messages not including an authorization key accepted by the ARF. Additionally or alternatively, the ARF may be configured to function as an "output filter" and filter services provided by an underlying service provider to a requesting user in response to receipt of a service access request message.

In some embodiments the ARF generation unit 108 may be configured to generate ARFs configured to operate in Boolean combination with one or more additional access rights filters. In this regard, a service may be protected by multiple ARFs operating in Boolean combination with each other. Thus an ARF may be generated to determine service access rights based upon service access rights determinations of one or more other ARFs with which the ARF is operating in Boolean combination. For example, a plurality of ARF may protect a service and operate together in accordance with Boolean OR logic, wherein if a user has an appropriate authorization key that is accepted by any of the ARFs the user's service access request may be granted. In another example, a plurality of ARFs may protect a service and operate together in accordance with Boolean AND logic, wherein for a user's service access request message to be granted, the service access request message must include a combination of one or more authorization keys such that each ARF accepts at least one of the authorization keys included in the service access request message.

In some embodiments, the ARF generation unit 108 may be further configured to generate an ARF that receives a service access request message comprising a service access request type denoting a type of access which the requesting user is requesting. For example, a service access request type may be a "read request" wherein a user simply requests to access a service, an "update request" wherein a user requests to update a service such as by updating existing or storing additional content or data in the service provider, or a "delete request" wherein a user requests to delete protected content or data stored and provided by the service provider. The ARF generation unit 108 may accordingly generate an ARF that is configured to determine service access rights based upon the service access request type. For example, a service access request message may be required to include an authorization key that is more "trusted" and conveys greater access rights for the ARF to grant a delete request than an authorization key required to grant a read request.

The authorization key generation unit 110 may be any means for generating an authorization key and may be embodied as hardware, software, firmware, or some combination thereof and may be embodied as or otherwise controlled by the processor 104. In embodiments where the authorization key generation unit 110 is embodied separately from the processor 104, the authorization key generation unit 110 may be in communication with the processor 104. The authorization key generation unit 110 may additionally be in communication with or embodied in conjunction with the ARF generation unit 108. The authorization key generation unit 110 may be configured to receive information about an access rights filter generated by the ARF generation unit 108 and based on the information generate one or more authorization keys accepted by the access rights filter. An authorization key generated by the authorization key generation unit 110 may be a simple string, such as a signature comprising a name or other indication of a service and a secret associated with the ARF by which the authorization key is accepted. An authorization key generated by the authorization key generation unit 110 may be stored in memory 114 or in memory of a remote access rights management entity 118 to which the authorization key is distributed and accessed by a user or application when sending a service access request message requiring use of the authorization key. In some embodiments, the authorization key generation unit 110 may be configured to generate authorization keys that may be used and stored as web browser cookies.

The access rights management entity 112 may be any means for executing an access rights filter and may be embodied as hardware, software, firmware, or some combination thereof and may be embodied as or otherwise controlled by the processor 104. Accordingly, the access rights management entity 112 may execute an ARF generated by the ARF generation unit 108 in accordance with any of the embodiments and ARF configurations discussed above. Each remote access rights management entity 118 may include an equivalent structure to the access rights management entity 112, such as, for example, a processor, for executing ARFs.

The memory 114 may include, for example, volatile and/or non-volatile memory. The memory 114 may be configured to store information, data, applications, instructions, or the like for enabling the apparatus to carry out various functions in accordance with exemplary embodiments of the present invention. For example, the memory 114 may be configured to buffer input data for processing by the processor 104. Additionally or alternatively, the memory 114 may be configured to store instructions for execution by the processor 104. As yet another alternative, the memory 114 may be one of a plurality of databases that store information in the form of static and/or dynamic information, for example, in association with mobile terminal context information, internet service context information, user status indicators, user activities, or the like. In this regard, the memory 114 may store, for example, access rights filters, authorization keys, information about capabilities of access rights management entities, received messages, and/or parameters extracted from received messages. This stored information may be used by the ARF generation unit 108, authorization key generation unit 110, and/or access rights management entity 112 for performing their respective functionalities.

The communication interface 116 may be any means for distributing access rights filters and/or authorization keys to an access rights management entity (local or remote) and may be embodied as any device or means embodied in hardware, software, firmware, or a combination thereof that is configured to receive and/or transmit data from/to a network and/or any other device or module in communication with the filter generating device 102. The communication interface 116 may be embodied as or otherwise controlled by the processor 104. In this regard, the communication interface 116 may include, for example, an antenna, a transmitter, a receiver, a transceiver and/or supporting hardware or software for enabling communications with other entities of the system 100 via the network. Accordingly, via the communication interface 116 and communication links over the network, the filter generating device 102 may communicate with the remote access rights management entities 118. In this regard, the communication interface 116 may be in communication with the user interface 106, ARF generation unit 108, authorization key generation unit 110, access rights management entity 112, and memory 114.

Figure 2:
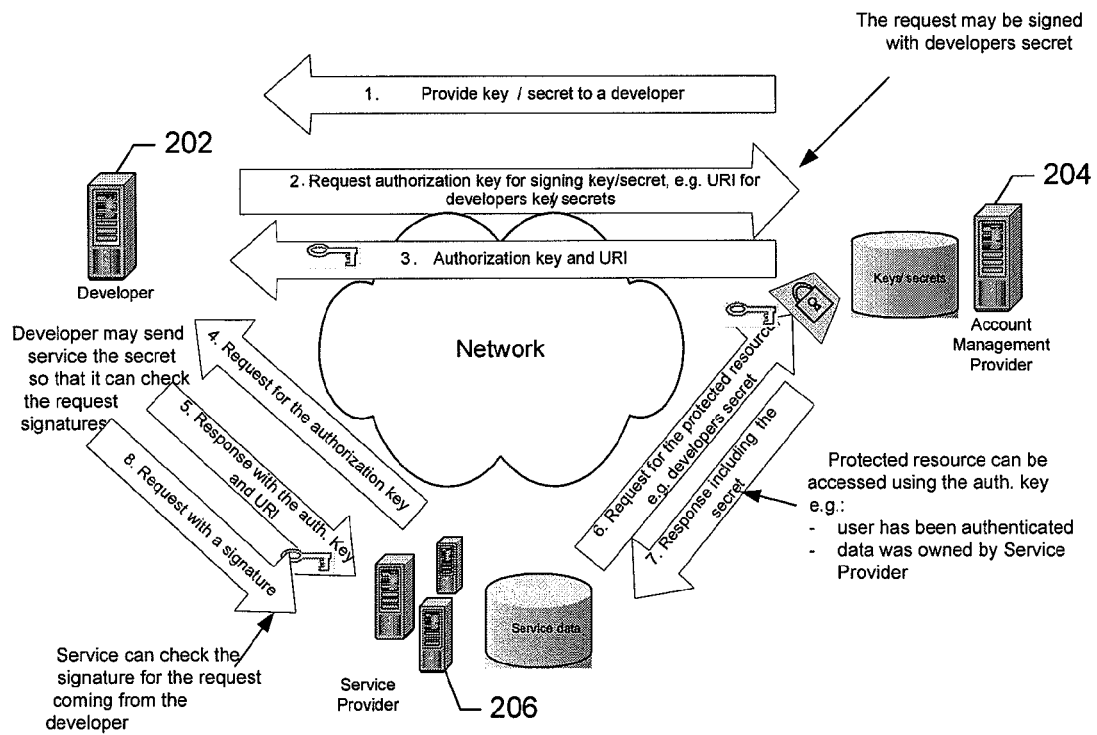
FIG. 2 illustrates a diagram of a system and use case scenario for providing distributed access rights management according to another exemplary embodiment of the present invention.

FIGS. 2-9 illustrate diagrams of systems and example use case scenarios for providing distributed access rights management according to exemplary embodiments of the present invention. Referring now to FIG. 2, a system according to an example use case comprising a developer 202, account management provider 204, and service provider 206 is illustrated. A developer 202 may be any content developer, such as a user that has captured a series of photographs, and stored the content with the service provider 206. The account management provider 204 may serve as a repository of data about registered service users and may accordingly include a number of stored account identifications and passwords associated with registered users. The account management provider 204 may further serve as a repository of keys and secrets. In this regard, the account management provider 204 may store data about a plurality of registered service users and each registered service user may be associated with a plurality of account identifications, such as user names and password combinations, each combination associated with a different service. The account management provider 204 may, for example, manage or otherwise communicate with a plurality of service providers 206 so as to provide for a single service sign-on and centralized user authentication manager. Resources stored by the account management provider 204 may be protected by an access rights filter. The service provider 206 may be any computing device or plurality of computing devices that provides access to a service to remote computing devices.

In the use case depicted in FIG. 2, the account management provider 204 may provide the developer 202 with a key and secret. The developer 202 may then request an authorization key from the account management provider 204 and in response to the request, the communication interface 116 of the account management provider 204 may distribute an authorization key to the developer. Note, that if necessary, the authorization key generation unit 110 of the account management provider 204 may generate an authorization key prior to distributing the authorization key to the developer 202. The service provider 206 may then request the authorization key from the developer 202, which may then respond by sending the authorization key and a service access request message to the service provider. The service provider 206 may then relay the service access request message including the authorization key to the account management provider 204. If the authorization key is accepted by the ARF protecting the resources of the account management provider 204, then the account management provider may respond with a message including a secret.

Figure 3:
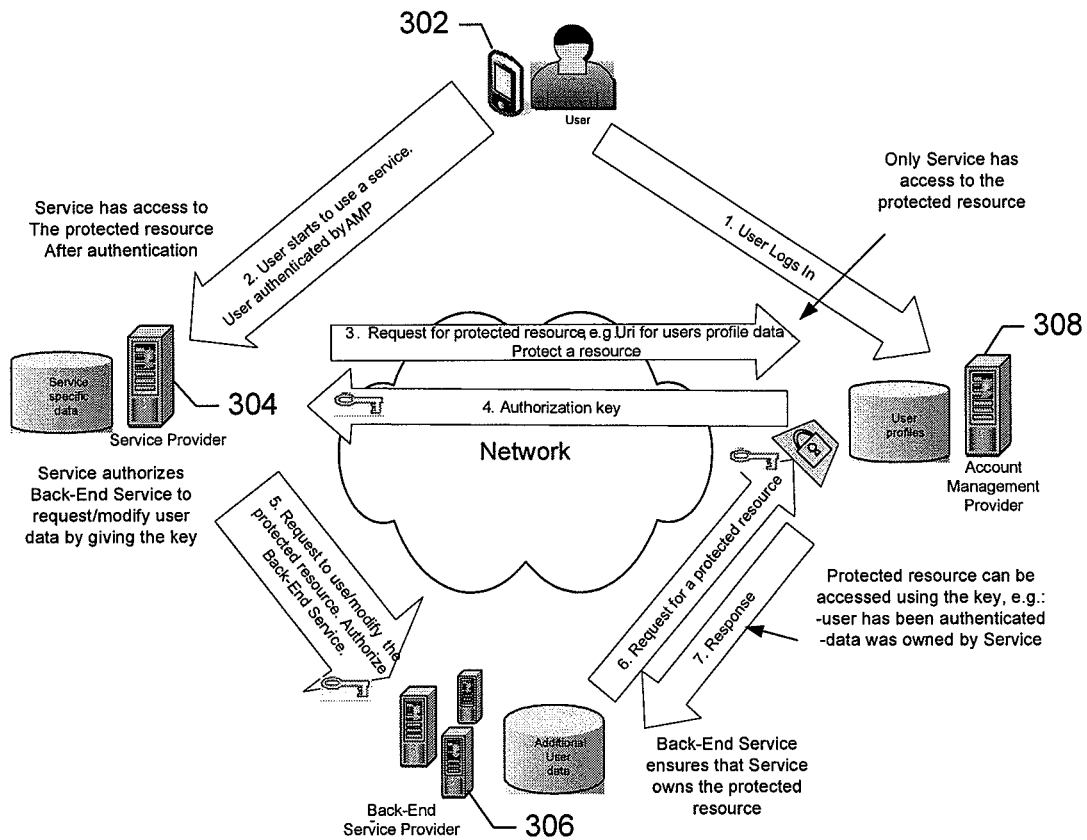
FIG. 3 illustrates a diagram of a system and use case scenario for providing distributed access rights management according to another exemplary embodiment of the present invention.

Referring now to FIG. 3, a system according to an example use case scenario comprising a user device 302, service provider 304, back-end service provider 306, and account management provider 308 is illustrated. The back-end service provider 306 may provide a service, such as data storage, to the service provider 304. A user using the user device 302 may initially log into the account management provider (AMP) 308. The user may then use a service provided by the service provider 304 and be authenticated by the account management provider. The service provider 304 may request access to the user's profile data from the AMP, which may be a resource protected by an ARF. The communication interface 116 of the AMP 308 may respond by distributing an authorization key accepted by the ARF to the service provider 304. The service provider 304 may then send a request comprising the authorization key to the back-end service 306 to use or modify the protected profile data and the back-end service 306 may subsequently send a request for the protected resource comprising the authorization key to the AMP 308. If the authorization key is accepted by the ARF protecting the resource, the AMP 308 may respond by providing access to the protected resource.

Figure 4:
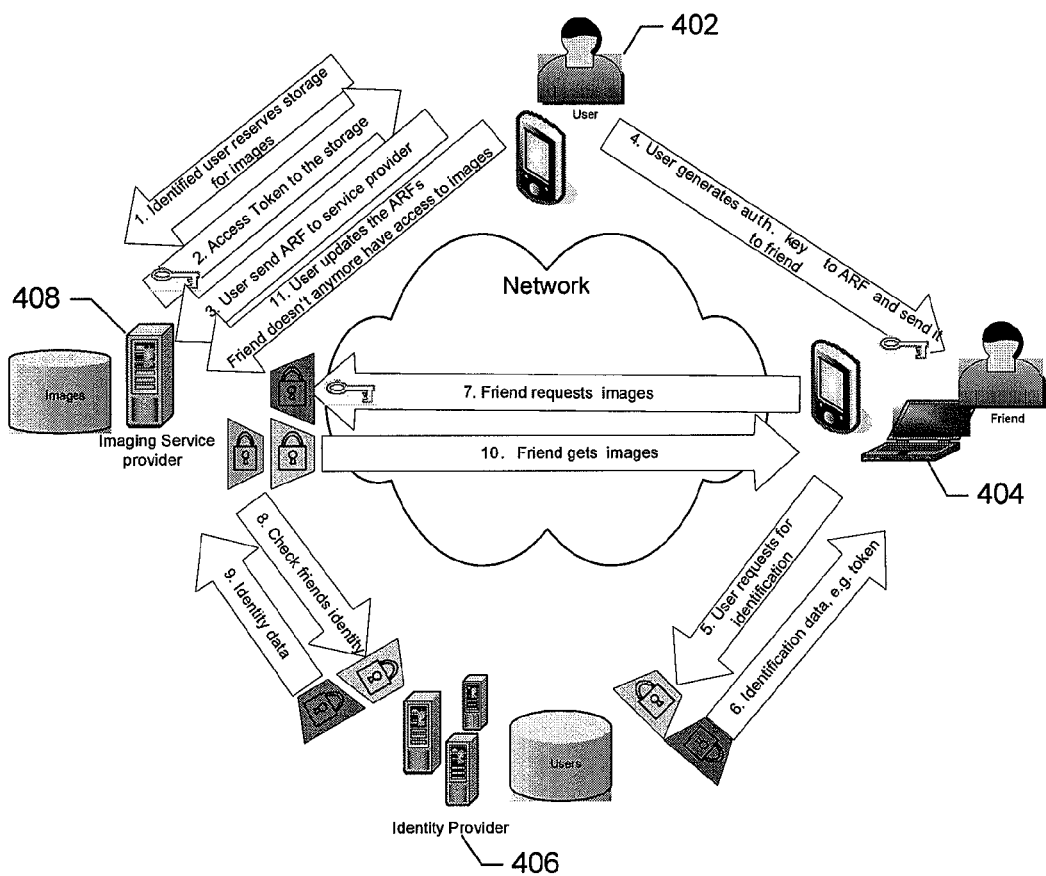
FIG. 4 illustrates a diagram of a system and use case scenario for providing distributed access rights management according to another exemplary embodiment of the present invention.

Referring now to FIG. 4, a system according to an example use case scenario comprising a user device 402, friend's device 404, identity provider 406, and imaging service provider 408 is illustrated. The identity provider 406 may store and provide user identity information and authenticate user identifications. The imaging service provider 408 may be a specific embodiment of a service provider and provide imaging services. The ARF generation unit 108 and authorization key generation unit 110 of the user device 402 may generate and store a plurality of ARFs and authorization keys in the memory 114 of the user device 402. The user of the user device 402 may reserve storage for images with the imaging service provider 408. The imaging service provider 408 may then send the user device 402 an access token to the storage. As used herein, "access token" may be a tuple with information associated with a particular user or consumer of a service and serve as an indication that the user has permission to access a service provided by a service provider such as the imaging service provider 408. The user 402 may then distribute an ARF to the imaging service provider 408 using the communication interface 116 of the user device 402 so as to protect the user's stored images. The user device 402 may then distribute an authorization key accepted by the ARF to the friend's device 404 via the communication interface 116. The friend's device may then request identification from the identity provider 406, which may then provide identification data such as an access token to the friend's device 404. The friend may then send a message to the imaging service provider 408 comprised of the authorization key and identification data. The imaging service provider 408 may then verify the friend's identification information with the identity provider 406 and if the friend's identity is verified, provide the friend's device 404 with access to the user 402's stored images.

Figure 5:
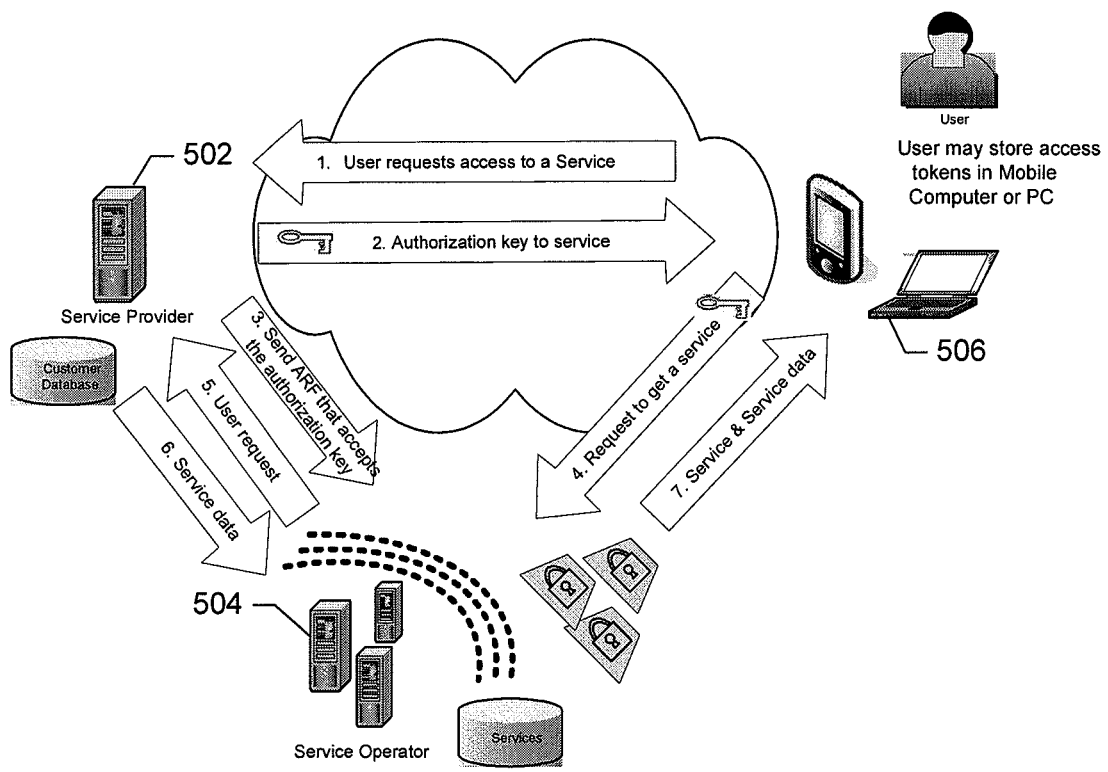
FIG. 5 illustrates a diagram of a system and use case scenario for providing distributed access rights management according to another exemplary embodiment of the present invention.

Referring now to FIG. 5, a system according to an example use case scenario comprising a service provider 502, service operator 504, and user device 506 is illustrated. The service operator 504 may be configured to handle requests for access to services provided by the service provider 502. Accordingly, services provided to users by the service operator 504 may be filtered by a series of output ARFs. A user of the user device 506 may initially request access to a service provided by the service provider 502 and the service provider may respond by distributing an authorization key generated by the authorization key generation unit 110 of the service provider 502 to the user device 506 via the communication interface 116. The service provider 502 may further distribute an ARF generated by the ARF generation unit 108 of the service provider 502 that accepts the authorization key to the service operator 504 again via the communication interface 116. The user device 506 may then send a service access request message comprising the authorization key to the service operator 504. The service operator may relay the user request to the service provider 502, which may then respond by sending service data to the service operator 504. The service operator 504 may then provide the user device 506 with the service and service data filtered based upon the user's authorization key.

Figure 6:
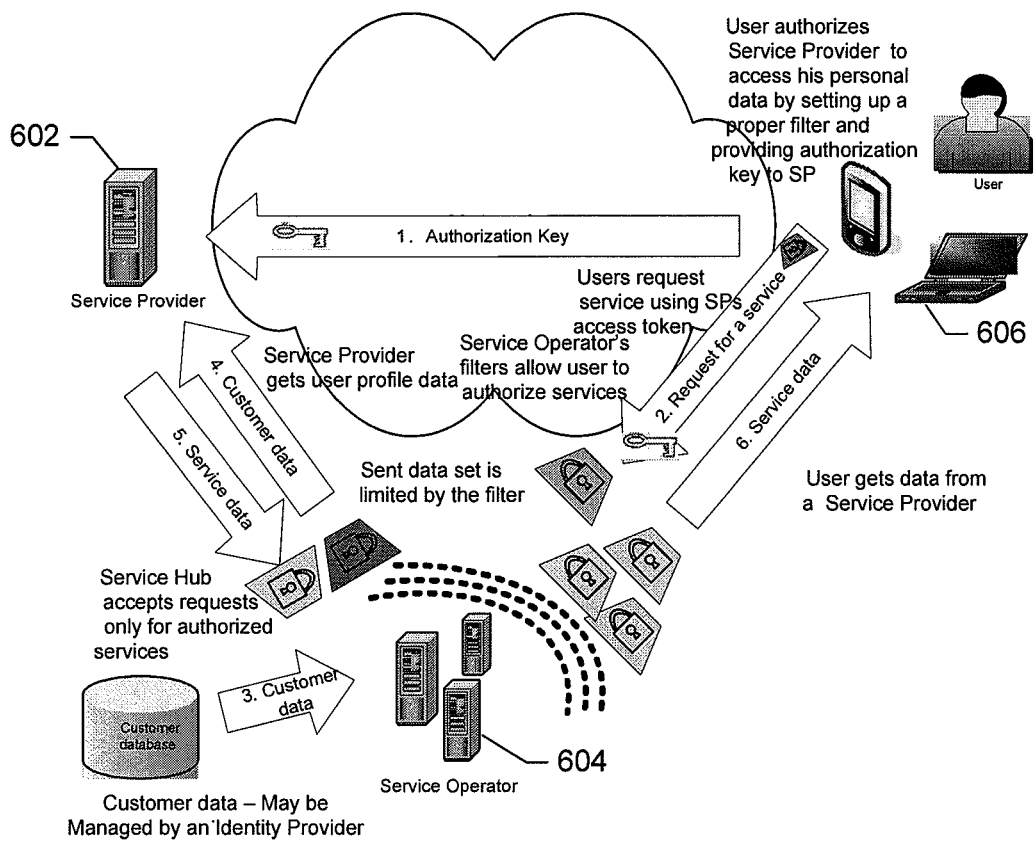
FIG. 6 illustrates a diagram of a system and use case scenario for providing distributed access rights management according to another exemplary embodiment of the present invention.

Referring now to FIG. 6, a system similar to that of FIG. 5 is illustrated. The system comprises a service provider 602, service operator 604, and user device 606. In this use case scenario, however, the user device 606 may additionally store personal data protected by an ARF and distribute an authorization key to the service provider 602 so that the service provider 602 may access the protected personal data.

Figure 7:
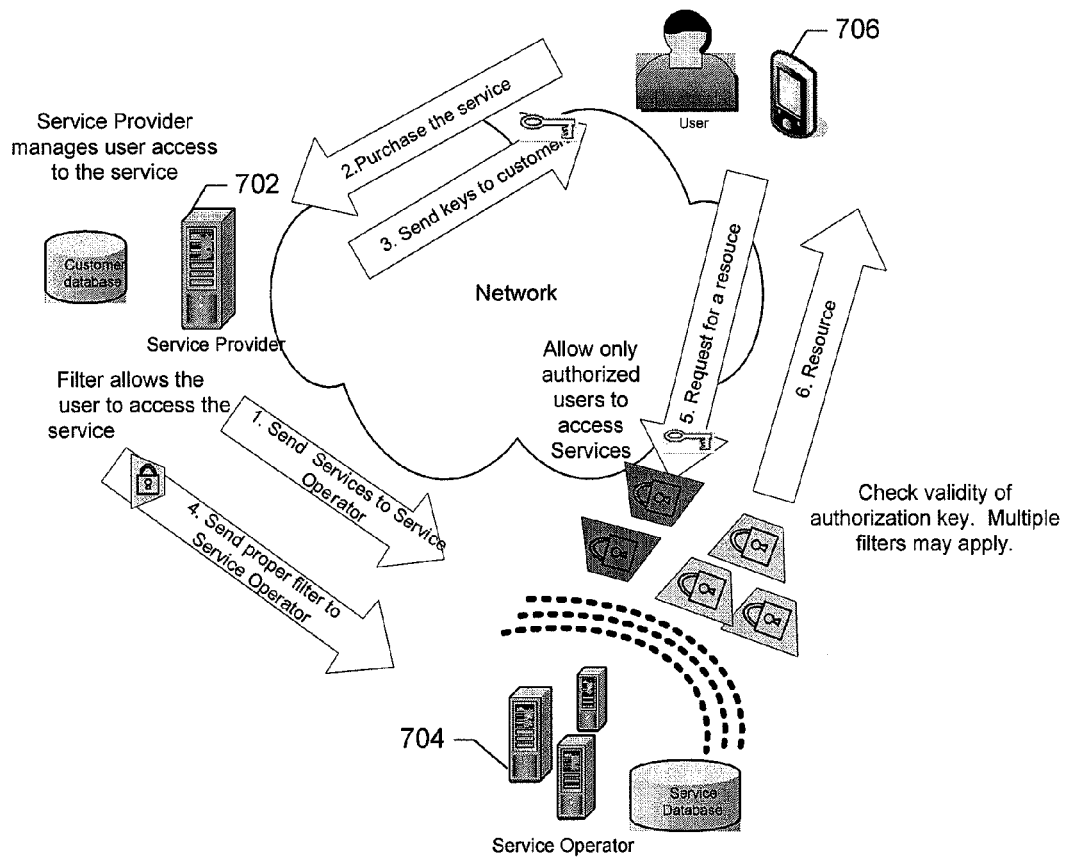
FIG. 7 illustrates a diagram of a system and use case scenario for providing distributed access rights management according to another exemplary embodiment of the present invention.

Referring now to FIG. 7, a system according to an example use case scenario where a user may purchase access to a service comprising a service provider 702, service operator 704, and user device 706 is illustrated. The user may purchase the service provided by the service provider 702 and accessed through the service operator 704. The communication interface 116 of the service provider 702 may then distribute one or more appropriate authorization keys generated by the authorization key generation unit 110 to the user device 706 and an ARF generated by the ARF generation unit 108 that accepts the one or more authorization keys to the service operator 704. The user may then send a service access request message comprising one or more authorization keys to the service operator 704. The service operator 704 may then provide the user device 706 with the protected service resource based upon the filtering of one or more output ARFs that may determine the user's access rights based upon the one or more provided authorization keys.

Figure 8:
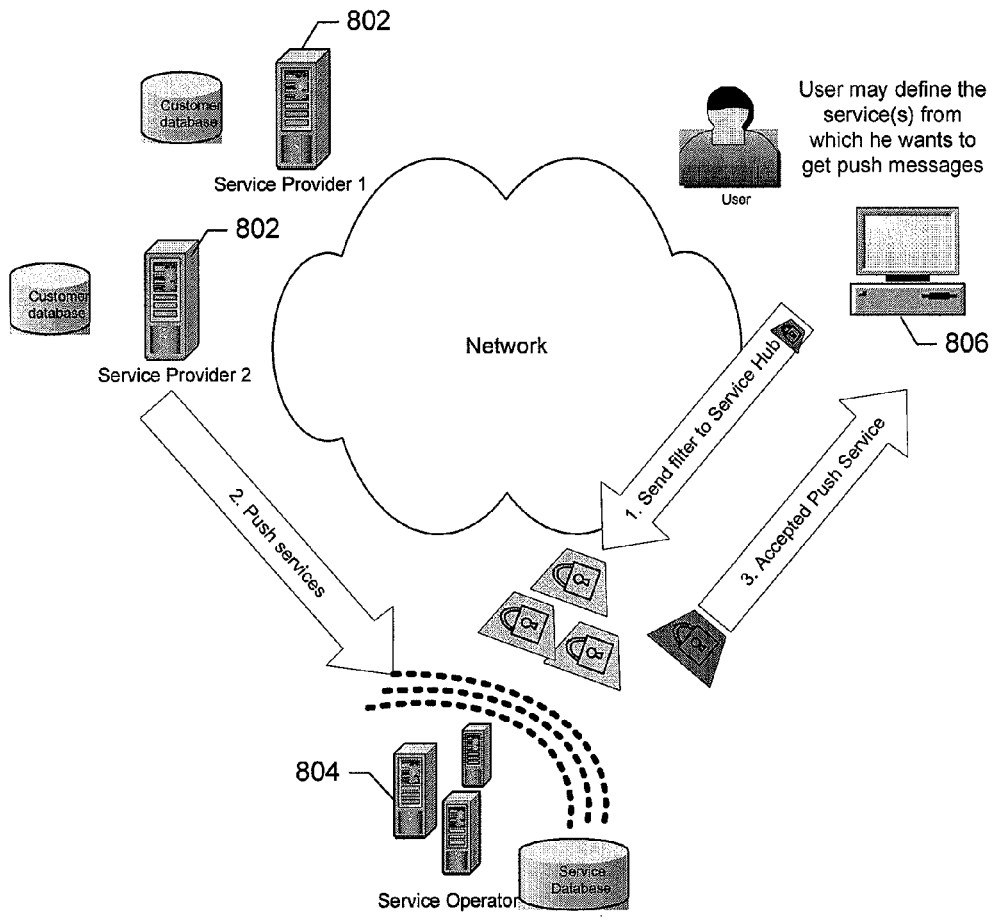
FIG. 8 illustrates a diagram of a system and use case scenario for providing distributed access rights management according to another exemplary embodiment of the present invention.

Referring now to FIG. 8, a system according to another example use-case scenario comprising a plurality of service providers 802, a service operator 804, and a user device 806 is illustrated. In this example, the plurality of service providers 802 may provide push services that may be pushed by the service operator 804 to subscribing user devices 806. In this example, the ARF generation unit 108 of the user device 806 may generate an output ARF associated with the user and the communication interface 116 of the user device 806 may then distribute it to the service operator 804. The service operator 804 may then push services provided by the plurality of service providers 802 to the user device 806 and the services may be filtered by the ARF associated with the user.

Figure 9:
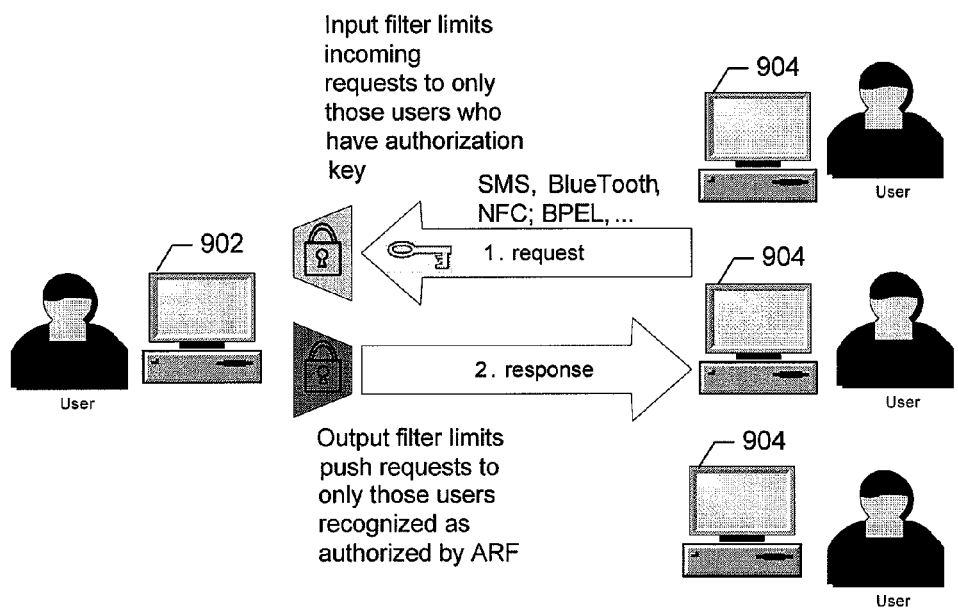
FIG. 9 illustrates a diagram of a system and use case scenario for providing distributed access rights management according to another exemplary embodiment of the present invention.

Referring now to FIG. 9, a system according to a peer-to-peer use case scenario comprising a user device 902 and a plurality of remote user devices 904 is illustrated. The user device 902 and remote user devices 904 may be any type of computing device and in some embodiments may be a mobile terminal configured to operate in accordance with web application protocol (WAP) standards. For example, the user device 902 and/or the remote user devices 904 may be configured to send and respond to WAP push requests. In this example use case, an ARF to filter incoming service access requests may be executed on the user device 902, such as by the access rights management entity 112 of the user device 902. The communication interface 116 of the user device 902 may distribute an authorization key generated by the authorization key generation unit 110 of the user device 902 and accepted by the ARF to trusted remote user device 904. The remote user devices 904 may send service access request messages comprising one or more authorization keys to the user device 902 and the ARF will accept only requests including an accepted authorization key. The access rights management entity 112 of the user device 902 may further execute an output ARF to filter outgoing push requests. This output ARF may have been generated by an ARF generation unit 108 of either the user device 902 or one of the remote user devices 904. The output ARF may filter out all outgoing push requests that are not directed to authorized remote user devices 904 as known to the output ARF so that the user device 902 may not establish a connection with an unauthorized remote user device 904 and thus does not receive pushed content from the unauthorized remote user device 904.

Figure 10:
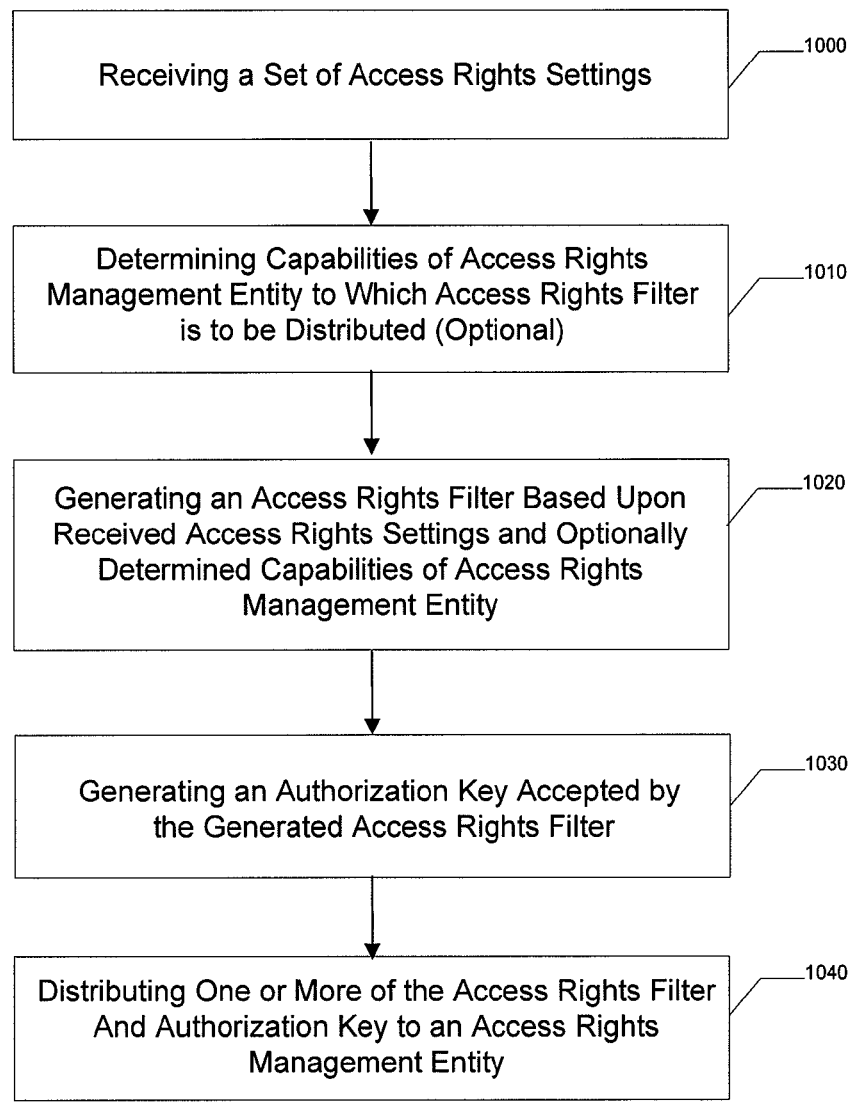
FIG. 10 is a flowchart according to an exemplary method for providing distributed access rights management according to an exemplary embodiment of the present invention.
Figure 11:
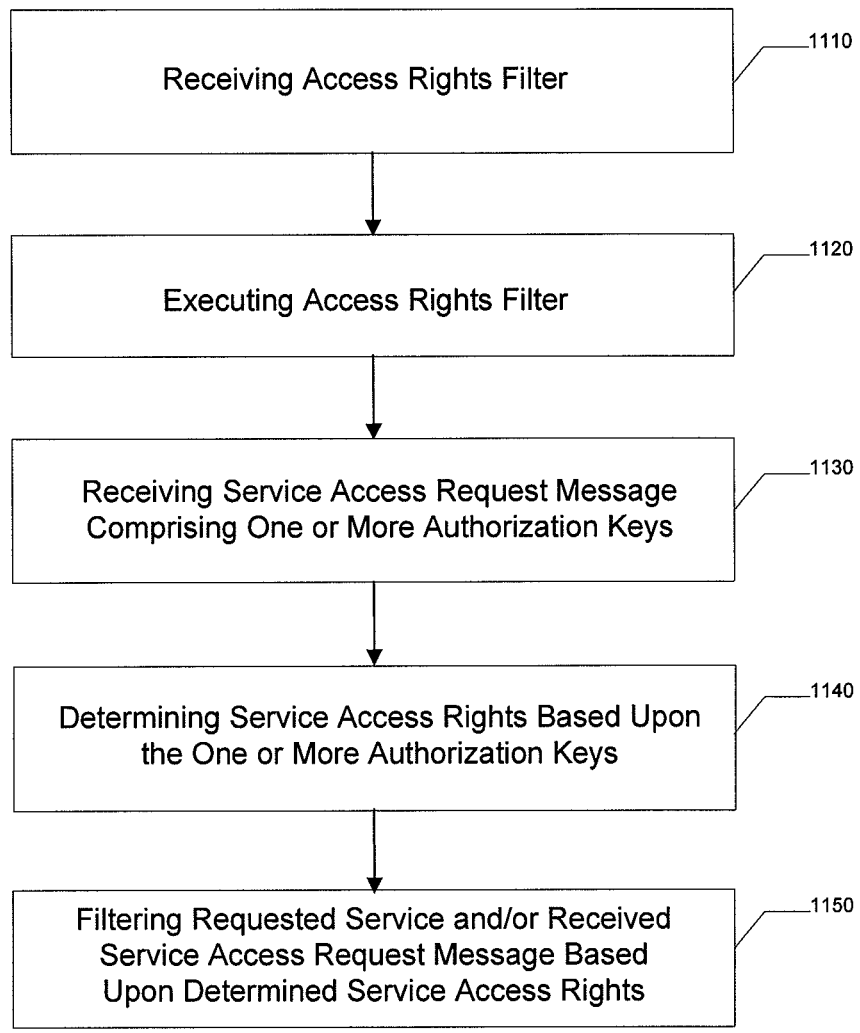
FIG. 11 is a flowchart according to an exemplary method for providing distributed access rights management according to an exemplary embodiment of the present invention.

FIGS. 10 and 11 are flowcharts of a system, method, and computer program product according to an exemplary embodiment of the invention. It will be understood that each block or step of the flowcharts, and combinations of blocks in the flowcharts, may be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal, server, or other computing device and executed by a built-in processor in the computing device. As will be appreciated, any such computer program instructions may be loaded onto a computer or other programmable apparatus (i.e., hardware) to produce a machine, such that the instructions which execute on the computer or other programmable apparatus create means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block (s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowchart, may be implemented by special purpose hardware-based computer systems which perform the specified functions or steps, or combinations of special purpose hardware and computer instructions.

In this regard, one exemplary method for providing a distributed access rights management using access rights filters according to an exemplary embodiment of the present invention is illustrated in FIG. 10. The method may include receiving a set of access rights settings at operation 1000 from but not limited to e.g. mobile, server or service provider. Operation 1010, which is optional, may comprise the ARF generation unit 108 determining capabilities of an access rights management entity to which an access rights filter is to be distributed. The ARF generation unit 108 may then generate an access rights filter based upon received access rights settings and any optionally determined capabilities of the access rights management entity at operation 1020. Operation 1030 may then comprise the authorization key generation unit generating an authorization key accepted by the generated access rights filter. The communication interface 116 may then distribute one or more of the access rights filter and authorization key to an access rights management entity at operation 1040.

FIG. 11 illustrates an exemplary method for providing distributed access rights management using access rights filters from the perspective of an access rights management entity, such as an access rights management entity 112 or a remote access rights management entity 118, according to an exemplary embodiment of the present invention. Accordingly, all operations illustrated in FIG. 11 are executed on an access rights management entity. The method may include receiving an access rights filter, such as from a communication interface 116 of a filter generating device 102 at operation 1110. Operation 1120 may comprise executing the access rights filter. Operation 1130 may comprise receiving a service access request message comprising one or more authorization keys. The executed ARF may then determine service access rights based upon the one or more authorization keys at operation 1140. The executed ARF may then filter the requested service and/or received service access request message based upon determined service access rights at operation 1150.

The above described functions may be carried out in many ways. For example, any suitable means for carrying out each of the functions described above may be employed to carry out embodiments of the invention. In one embodiment, all or a portion of the elements generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention may provide several advantages for owners of services and other resources who wish to protect their resources by restricting access to the resources to trusted users based upon access rights definitions. In this regard, content and service owners may generate distributable access rights filters configured to grant or otherwise filter access to content based upon received authorization keys recognized by the access rights filters. These authorization keys are also distributable such that authorization keys may be distributed only to trusted users. Rather than define a plurality of listings of users with each list having associated access rights permissions, a content owner may instead generate one or more ARFs defining access rights levels and distribute authorization keys to trusted users without having to manually add new users to a centralized access rights list.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/ or functions than those explicitly described above are also contemplated as may be set forth in some of the appended claims. Although specific terms are employed herein, they are used in a generic and descriptive sense only and not for purposes of limitation.

What is claimed is:

1. A method comprising:
   generating, by a processor, an access rights filter configured to accept at least one specified authorization key and comprising executable code based at least in part upon a set of one or more access rights settings, the at least one specified authorization key associated with the access rights filter at the time of generation of the access rights filter; and
   causing the access rights filter to be distributed to an access rights management entity, wherein the generated access rights filter is configured, when executed on the access rights management entity, to receive a service access request message comprising one or more received authorization keys, determine service access rights based on whether the one or more received authorization keys included in the service access request message match the at least one specified authorization key, and filter the service access request message based at least in part upon the determined service access rights.

2. A method according to claim 1, wherein the generated access rights filter is further configured, when executed on the access rights management entity, to receive a service access request message further comprising a service access request type, and to determine service access rights further based upon the service access request type.

3. A method according to claim 1, wherein the generated access rights filter is further configured, when executed on the access rights management entity, to filter services provided to a requesting device in response to receipt of the service access request message based at least in part upon the one or more received authorization keys included in the service access request message.

4. A method according to claim 1, wherein generating an access rights filter further comprises generating an access rights filter further based upon capabilities of the access rights management entity.

5. A method according to claim 1, wherein the generated access rights filter is further configured, when executed on the access rights management entity, to operate in Boolean combination with one or more additional access rights filters and determine service access rights based at least in part upon access rights determinations of the one or more additional access rights filters.

6. A method according to claim 1, further comprising:
causing a user interface for receiving a set of access rights settings to be provided; and
receiving the set of one or more access rights settings via the user interface.

7. A computer program product comprising at least one non-transitory computer-readable storage medium having computer-readable program code portions stored therein, the computer-readable program code portions comprising:
a program code portion for generating an access rights filter configured to accept at least one specified authorization key and comprising executable code based upon a set of one or more access rights settings, the at least one specified authorization key associated with the access rights filter at the time of generation of the access rights filter; and
a program code portion for causing the access rights filter to be distributed to an access rights management entity,
wherein the generated access rights filter is configured, when executed on the access rights management entity, to receive a service access request message comprising one or more received authorization keys, determine service access rights based on whether the one or more received authorization keys included in the service access request message match the at least one specified authorization key, and filter the service access request message based at least in part upon the determined service access rights.

8. A computer program product according to claim 7, wherein the generated access rights filter is further configured, when executed on the access rights management entity, to receive a service access request message further comprising a service access request type, and to determine service access rights further based upon the service access request type.

9. A computer program product according to claim 7, wherein the generated access rights filter is further configured, when executed on the access rights management entity, to filter services provided to a requesting device in response to receipt of the service access request message based at least in part upon the one or more received authorization keys included in the service access request message.

10. A computer program product according to claim 7, wherein the program code portion for generating an access rights filter includes instructions for generating an access rights filter further based upon capabilities of the access rights management entity.

11. A computer program product according to claim 7, wherein the generated access rights filter is further configured, when executed on the access rights management entity, to operate in Boolean combination with one or more additional access rights filters and determine service access rights based at least in part upon access rights determinations of the one or more additional access rights filters.

12. An apparatus comprising at least one processor and at least one memory storing computer program code, wherein the at least one memory and stored computer program code are configured, with the at least one processor, to cause the apparatus to at least:
generate an access rights filter configured to accept at least one specified authorization key, the access rights filter comprising executable code based at least in part upon a set of one or more access rights settings, and the at least one specified authorization key associated with the access rights filter at the time of generation of the access rights filter; and
cause the access rights filter to be distributed to an access rights management entity,
wherein the generated access rights filter is configured, when executed on the access rights management entity, to receive a service access request message comprising one or more received authorization keys, determine service access rights based on whether the one or more received authorization keys included in the service access request message match the at least one specified authorization key, and filter the service access request message based at least in part upon the determined service access rights.

13. An apparatus according to claim 12, wherein the generated access rights filter is further configured, when executed on the access rights management entity, to receive a service access request message further comprising a service access request type and to determine service access rights further based upon the service access request type.

14. An apparatus according to claim 12, wherein the generated access rights filter is further configured, when executed on the access rights management entity, to filter services provided to a requesting device in response to receipt of the service access request message based at least in part upon the one or more-received authorization keys included in the service access request message.

15. An apparatus according to claim 12, wherein the at least one memory and stored computer program code are configured, with the at least one processor, to cause the apparatus to generate an access rights filter further based upon capabilities of the access rights management entity.

16. An apparatus according to claim 12, wherein the generated access rights filter is further configured, when executed on the access rights management entity, to operate in Boolean combination with one or more additional access rights filters and determine service access rights based at least in part upon access rights determinations of the one or more additional access rights filters.

17. An apparatus according to claim 12, wherein the at least one memory and stored computer program code are configured, with the at least one processor, to further cause the apparatus to:

cause a user interface for receiving a set of access rights settings to be provided; and receive the set of one or more access rights settings via the user interface.

18. A method comprising:

receiving an access rights filter comprising executable code distributed by a filter generating entity, the access rights filter associated with at least one specified authorization key during generation of the access rights filter; and executing, by a processor, the access rights filter, the executing comprising:

receiving, by the access rights filter, a service access request message comprising one or more received authorization keys;

determining, by the access rights filter, service access rights based on whether the one or more received authorization keys included in the service access request message matches the at least one specified authorization key; and filtering, by the access rights filter, the service access request message based at least in part upon the determined service access rights.

19. A method according to claim 18, wherein the received service access request message further comprises a service access request type, and wherein determining service access rights comprises determining service access rights further based on the service access request type.

20. A method according to claim 18, wherein filtering comprises filtering services provided to a requesting device in response to receipt of the service access request message based at least in part upon the one or more received authorization keys included in the service access request message.

21. A method according to claim 18, wherein executing the access rights filter comprises executing the access rights filter in Boolean combination with one or more additional access rights filters, and wherein determining service access rights comprises determining service access rights further based on access rights determinations of the one or more additional access rights filters.

* * * * *